United States Patent [19]

Chang et al.

[11] 3,928,483

[45] Dec. 23, 1975

[54] PRODUCTION OF GASOLINE HYDROCARBONS

[75] Inventors: Clarence Dayton Chang, Princeton, N.J.; Anthony John Silvestri, Morrisville, Pa.; Robert Lloyd Smith, Hopewell, N.J.

[73] Assignee: Mobil Oil Corporation, New York, N.Y.

[22] Filed: Sept. 23, 1974

[21] Appl. No.: 508,112

[52] U.S. Cl.......... 260/668 R; 208/135; 260/614 R; 260/673; 260/682
[51] Int. Cl.²................... C10G 37/06; B01J 29/28
[58] Field of Search..................................... 260/668

[56] References Cited
UNITED STATES PATENTS

| | | | |
|---|---|---|---|
| 2,456,584 | 12/1948 | Gorin | 260/668 |
| 3,728,408 | 4/1973 | Tobias | 260/668 |
| 3,756,942 | 9/1973 | Cattanach | 208/137 |
| 3,760,024 | 9/1973 | Cattanach | 260/673 |
| 3,813,330 | 5/1974 | Givens et al. | 260/668 |
| 3,827,867 | 8/1974 | Heinemann et al. | 260/668 |
| 3,984,105 | 7/1975 | Chang et al. | 260/668 R |
| 3,984,106 | 7/1975 | Chang et al. | 260/668 R |
| 3,984,107 | 7/1975 | Chang et al. | 260/668 R |

*Primary Examiner*—Delbert E. Gantz
*Assistant Examiner*—G. E. Schmitkons
*Attorney, Agent, or Firm*—Charles A. Huggett; Carl D. Farnsworth

[57] ABSTRACT

This specification discloses a process for the production of aromatics-rich gasoline boiling-range hydrocarbons from the lower alcohols methanol, ethanol and propanol, or their ethers. The process is carried out in two or more stages. In the first stage, an alcohol or an ether is contacted with a condensation catalyst to produce a reaction product containing aliphatic dehydration products thereof and water. In a subsequent stage, at least a portion of the product of the first reaction stage is contacted with, as a catalyst, a crystalline aluminosilicate zeolite having a silica to alumina ratio of at least 12 and a constraint index of 1 to 12 to convert it in high yield to gasoline boiling-range hydrocarbons containing a high proportion of aromatics.

In a preferred aspect a lower alcohol, suitably methanol, is dehydrated to an ether or a lower olefin or mixtures thereof, in the first stage, and this first stage product is then converted, over the referred to catalyst, to gasoline boiling-range hydrocarbons.

13 Claims, No Drawings

PRODUCTION OF GASOLINE HYDROCARBONS

BACKGROUND OF THE INVENTION

1. Field of the Invention

This invention relates to the production of gasoline boiling-range hydrocarbons from an alcohol or ether starting material. It more particularly refers to such production from methanol, dimethyl ether or mixtures containing such.

2. Description of the Prior Art

U.S. Pat. No. 3,036,134 to Mattox discloses the conversion of methanol to a reaction product containing water and dimethyl ether in the presence of, as a catalyst, a crystalline aluminosilicate.

Copending application Ser. No. 387,223, filed Aug. 9, 1973 (now U.S. Pat. No. 3,984,107) discloses the conversion of a reactant comprising alcohols and other similarly substituted lower aliphatic organic compounds to a reaction product containing water and highly aromatic, gasoline boiling-range hydrocarbons, by contacting such reactant with a crystalline aluminosilicate having a silica to alumina ratio of at least about 12 and a constraint index, as there defined, of about 1 to 12.

Copending application Ser. No. 387,222, filed Aug. 9, 1973 (now U.S. Pat. No. 3,984,106), discloses the conversion of ethers to a reaction product containing water and gasoline boiling-range hydrocarbons by contacting such ethers with a similarly definned catalyst.

The applicable class of catalysts is exemplified by the zeolites ZSM-5, ZSM-11, ZSM-12, ZSM-21, and TEA Mordenite.

U.S. Pat. No. 3,702,886 issued Nov. 14, 1972 to Argauer et al, discloses ZSM-5 zeolite catalyst.

U.S. Pat. No. 3,709,979 issued Jan. 9, 1973 to Chu discloses ZSM-11 zeolite catalyst.

West German Auslegeschrift No. 2213109 discloses ZSM-12 zeolite catalyst.

Copending application Ser. No. 358,192, filed May 7, 1973 (now abandoned) discloses ZSM-21 zeolite catalyst.

Copending application Ser. No. 130,442, filed Apr. 11, 1971 (now abandoned), discloses TEA mordenite zeolite catalyst.

Although the above-described conversions perform exceptionally well and are unusually effective at converting various oxygenated organic chemicals to high quality gasoline hydrocarbons, it has been found that these conversions are exothermic to varying degrees depending on the particular reactant composition. For example, the amount of heat generated in the conversion of the lower alcohols to hydrocarbon mixtures that contain perponderant quantities of gasoline hydrocarbons may be estimated to be in the ranges shown:

| Alcohol Reactant | Heat Produced, BTU per lb. Hydrocarbons |
|---|---|
| Methanol | 1300–2000 |
| Ethanol | 280–620 |
| Propanol | 20–360 |

While it is desirable that a reaction be somewhat exothermic, since this obviates the need for an external source of heat to drive the reaction, large exothermic heat loads can require substantial investment in complex reactors with extensive cooling means, thereby detracting from the overall economic efficiency of the process. It can be seen from the above table that the conversion of methanol, and to a lesser degree of ethanol, could be considered excessively exothermic in this regard. Furthermore, because of the inherent character and efficiency of the above described crystalline aluminosilicate zeolite catalysts, the reaction of methanol, and to a lesser degree of ethanol, tend to be self-accelerating, thereby creating excessively hot local regions, where the reaction tends to go to completion, in the catalyst bed. Thus, the simple expedient of conducting the reaction partially in a first zeolite catalyst bed, cooling, and completing it in a second such bed, which could conceivably be effective for a mildly exothermic reaction, is not available to facilitate heat removal in the above described conversion of methanol. Additionally, it is generally good engineering practice to conduct vapor-phase conversions at elevated pressures to more effectively utilize the reactor volume. With a methanol charge, however, elevated pressures tend to produce increased quantities of 1,2,4,5-tetramethylbenzene (durene).

Although durene by itself can be a valuable petrochemical, and a process for producing it is in fact described in copending application Ser. No. 387,221 filed Aug. 9, 1973, excessive amounts of durene in gasoline can be troublesome. While not wishing to be bound by theory, this particular aromatic compound is believed to result at least in part from the mixing and reaction of yet-unconverted methanol with already-formed aromatic hydrocarbon products. Because durene is a solid at normal temperatures and pressures, with a melting point of 175°F, it may crystallize out of the gasoline in unheated transfer lines or in storage tanks. Also, when the liquid hydrocarbon product produced by this invention is used to manufacture benzene, toluene and xylenes, the occurrence of excessive durene may detract from their yields. In any case, with a methanol feed, whatever advantage may be gained by increasing pressure may similarly be offset to some extent by increased durene production. Furthermore, high pressures at the elevated temperatures required for the conversion, because of the presence of the large fraction of steam produced in converting any of the lower alcohols, but especially methanol, may tend to induce premature deterioration of the zeolite catalyst, especially in overheated local regions of the catalyst.

It is therefore an object of this invention to provide a novel technique for converting $C_1$ to $C_3$ alchols and ethers thereof to gasoline boiling-range hydrocarbons.

It is another object of this invention to provide a novel technique for converting $C_1$ to $C_3$ alcohols to gasoline.

Other and additional objects of this invention will become apparent from a consideration of this entire specification including the claims hereof.

SUMMARY OF THE INVENTION

In accordance with one aspect of the invention, $C_1$ to $C_3$ alcohols are converted to highly aromatic, gasoline boiling-range hydrocarbons by a process involving multiple stages. In the first stage, the alcohol reactant is contacted with a condensation catalyst to produce water, heat, and a predominantly aliphatic organic intermediate product. In the last stage, the intermediate product, with or without further modification, is contacted with, as a catalyst, a crystalline aluminosilicate zeolite having a silica to alumina ratio of at least 12 and a constraint index of 1 to 12 as defined below to convert the intermediate product to a final product which may contain water. The organic portion of this final product is a hydrocarbon mixture having a preponderance of normally fluid hydrocarbon constituents, including substantial quantities of aromatics, in the gasoline boiling-range of up to 415°F.

DETAILED DESCRIPTION OF INVENTION

The lower alcohols that may be charged to the process of this invention, or more specifically to the first stage of the staged sequence, include methanol, ethanol, n-propanol, and isopropanol. This feed may consist of a relatively pure single alcohol; or, mixtures of these with one another; or, mixtures of these alcohols with other components such as higher alcohols. In general, any mixture comprising: methanol; or ethanol; or n-propanol; or isopropanol; and which is convertible with high exothermicity by the process described in copending application Ser. No. 387,223, filed Aug. 9, 1973, is a suitable feed for the first stage of the present invention. Conversions which produce more than about 100 BTU/lb of total hydrocarbon product, at conversion temperature, are considered highly exothermic for the purpose of the present invention. It is to be recognized, of course, that the more exothermic the overall conversion, the greater is the need to practice this invention. This is particularly true since those feed compositions which react most exothermically also produce the largest proportions of product water.

The preferred charges to the first stage of the present invention are ethanol and/or methanol. Particularly preferred are charges comprising substantial fractions, i.e., more than 25 weight percent, of methanol. Mixtures of methanol and dimethyl ether are included as preferred charges.

In the first stage of the present invention the alcohol reactant is contacted with a condensation catalyst to produce water and a predominatly aliphatic organic intermediate product. The condensation catalyst may be any catalyst which results in the intermolecular dehydration of the alcohol reactant to form an aliphatic product of higher carbon to oxygen ratio than the feed.

The condensation reactions contemplated include those that form simple and mixed ethers such as: dimethyl ether, diethyl ether, di-n-propyl ether, diisopropyl ether, methyl ethyl ether, methyl n-propyl ether, methyl isopropyl ether, ethyl n-propyl ether, ethyl isopropyl ether, and n-propyl isopropyl ether. All of these intermediates may be formed by the intermolecular dehydration of corresponding alcohol reactants, and all of these condensations are exothermic and generate heat. This condensation, by itself, is not here considered inventive and it is noted that numerous acidic catalysts known in the art are very effective for this single dehydration. Such catalysts include, by way of example, liquid acids such as sulfuric and phosphoric acids, and solid inorganic and organic acidic catalysts such as phosphoric acid supported on kieselguhr, high surface area silica-alumina, acidic aluminas, acid treated clays, bauxites, and polystyrene sulfonic acids of the ion-exchange type including the macroreticular variety. For the purpose of this invention, it is preferred to use solid acidic catalysts.

Intramolecular dehydration reactions, such as the dehydration of ethanol to ethylene and water, and of n-propanol or isopropanol to propylene and water, although they form water and an aliphatic intermediate that has a higher carbon to oxygen ratio than the feed, are not included in the condensation reactions herein referred to. While it is true that these dehydration reactions serve the purpose of removing water from the alcohol reactant, and thereby permit a staged process in which the last stage of conversion may be carried out in the substantial absence of steam, these dehydrations are endothermic rather than exothermic. Thus, rather than decreasing the heat removal problems associated with the final stage conversion over the zeolite, the use of such dehydrations as a first stage would actually aggravate the problem. Actually, it is the teaching of this invention to conduct the overall conversion as a sequence of exothermal stages and to avoid any endothermic stage.

Those skilled in the art will recognize that with methanol feed, no intramolecular dehydration is possible, and that therefore the condensation reaction can only proceed exothermally to form, for example, dimethyl ether. With ethanol, propanol, and isopropanol, on the other hand, the desired exothermic condensation and the undesired endothermic dehydration may occur over the same catalyst to different degrees under different conditions. For example, ethanol vapor passed over a certain solid acidic catalyst at about 212°F will form, exothermally, diethyl ether; however, at substantially higher temperatures, ethanol will intramolecularly dehydrate to ethylene, which by itself is an undesirable reaction for the purpose of this invention. In fact, over certain acidic catalysts, it is well known that a dehydrogenation reaction to form aldehydes or ketones may set in at high temperature which not only does not split out water but is also endothermic. Such a reaction, per se, is of course counterproductive in the present invention.

Having pointed out that the same solid acidic catalysts useful for the first stage of the process of this invention may catalyze undesired endothermic conversions along with the desired exothermic condensations, it becomes now important to emphasize that the mixed reactions are useful so long as reaction conditions for any particular catalyst and feed are chosen such that the conversion in this first stage is exothermic to the extent of generating at least about 50 BTU/lb of hydrocarbon product formed by the process. Unlike most known sequential processes, which require the intermediate produced to be purified or pure, the predominantly aliphatic intermediate produced in the above-described condensation reaction need not be purified, since the organic condensation product and the organic by-products as well are converted very effectively to gasoline hydrocarbons over the zeolite catalyst of the last stage. The remarkable ability of the herein below described zeolite catalysts to accept a wide range of intermediate compositions and convert these to aromatics-rich gasoline boiling-range hydrocarbons imparts great flexibility to the process of this invention. This cooperative interaction permits optimization of the design and operation of each stage of the process under a wide variety of constraints on costs and availability of materials.

The extent of reaction of alcohols to ethers will be limited by equilibrium constraints if no recycle loop is included in the first stage. Thus, without recycle, the predominantly aliphatic intermediate product will consist of a mixture of ether and unconverted alcohol. Removal of ether or water or both and recycling the remainder in this first stage may be practiced to increase the alcohol conversion. In any case, it is preferred to react at least 25 percent of the lower alcohol feed to the first stage.

For the purpose of this invention, the condensation reaction just described need not be limited to the formation of simple ethers, but may indeed include further exothermic conversion of these ethers to predominantly olefinic aliphatic hydrocarbons with additional elimination of water. This further conversion may be included as an integral part of the first stage conversion or it may be conducted as a separate stage, as described later, with the same or different acidic catalyst than used in the first stage.

Contact of the lower alcohol feed, with the solid acidic catalyst in the first stage of the process of this invention may be carried out by passing the alcohol through a bed of the catalyst. The alcohol may suitable be in the form of a vapor and the catalyst bed may be any of the fixed, fixed fluid, or transported bed types. In a fixed or moving bed operation, the average particle size of the catalyst may be as great as one-half inch or more, but is generally between about 1/16 and ¼ inch in diameter. If a fluid bed is employed, the catalyst must be in finely divided form which can be fluidized by the lifting action of the alcohol, ether intermediate and water vapor. Transport type catalyst beds, such as those used in fluid catalytic cracking, may be used.

With respect to reaction conditions, contact of the alcohol feed with the condensation catalyst should be at temperatures about 250° to 900°F. The pressure may be atmospheric although sub-atmospheric or higher pressures, e.g., up to about 500 psig may also be used. The feed to the catalyst bed may be from 0.5 to 5000 WHSV, i.e., unit weights of alcohol per unit weight of catalyst per hour.

The class of zeolites utilized in the last stage of the process of this invention has some unusual properties. These zeolites by themselves induce profound transformations of aliphatic hydrocarbons to aromatic hydrocarbons in commercially desirable yields. Although they have unusually low alumina contents, i.e., high silica to alumina ratios, they are very active even when the silica to alumina ratio exceeds 30. The activity is surprising since the alumina in the zeolite framework is believed responsible for catalytic activity. They retain their crystallinity for long periods in spite of the presence of steam at high temperature which induces irreversible collapse of the framework of other zeolites, e.g. of the X and A type. Furthermore, carbonaceous deposits, when formed, may be removed by burning at higher then usual temperatures to restore activity.

An important characteristic of the crystal structure of this class of zeolites is that it provides constrained access to, and egress from, this intracrystalline free space by virtue of having a pore dimension greater than about 5 Angstroms and pore windows of about a size such as would be provided by 10-membered rings of oxygen atoms. It is to be understood, of course, that these rings are those formed by the regular disposition of the tetrahedra making up the anionic framework of the crystalline aluminosilicate, the oxygen atoms themselves being bonded to the silicon or aluminum atoms at the centers of the tetrahedra. Briefly, the preferred zeolites useful in this invention, possess, in combination: a silica to alumina ratio of at least about 12; and a structure providing constrained access to the crystalline free space.

The silica to alumina ratio referred to may be determined by conventional analysis. This ratio is meant to represent, as closely as possible, the ratio in the rigid anionic framework of the zeolite crystal and to exclude aluminum in the binder or in cationic form within the channels. Although zeolites with a silica to alumina ratio of at least 12 are useful, it is preferred to use zeolites having higher ratios of at least about 30. Such zeolites, after activation, acquire an intracrystalline sorption capacity for normal hexane which is greater than that for water, i.e., they exhibit "hydrophobic" properties. It is believed that this hydrophobic character is advantageous in the present invention.

The type zeolites useful in this invention freely sorb normal hexane and have a pore dimension greater than about 5 Angstroms. In addition, the structure must provide constrained access to larger molecules. It is sometimes possible to judge from a known crystal structure whether such constrained access exists. For example, if the only pore window in a crystal are formed by eight membered rings of oxygen atoms, then access to molecules of larger cross-section than normal hexane is excluded and the zeolite is not of the desired type. Windows of ten-membered rings are preferred, although excessive puckering or pore blockage may render these zeolites ineffective. Twelve-membered rings do not generally appear to offer sufficient constraint to produce the advantageous conversions, although structures can be conceived, due to pore blockage or other cause, that may be operative.

Rather than attempt to judge from crystal structure whether or not a zeolite possesses the necessary constrained access, a simple determination of the "constraint index" may be made by passing continuously a mixture of equal weight of normal hexane and 3-methylpentane over a small sample, approximately 1 gram or less, of zeolite at atmospheric pressure according to the following procedure. A sample of the zeolite, in the form of pellets or extrudate, is crushed to a particle size about that of coarse sand and mounted in a glass tube. Prior to testing, the zeolite is treated with a stream of air at 1000°F for at least 15 minutes. The zeolite is then flushed with helium and the temperature adjusted between 550°F and 950°F to give an overall conversion between 10% and 60%. The mixture of hydrocarbons is passed at 1 liquid hourly space velocity (i.e., 1 volume of hydrocarbon per volume of zeolite per hour) over the zeolite with a helium dilution to give a helium to total hydrocarbon mole ratio of 4:1. After 20 minutes on stream, a sample of the effluent is taken and analyzed, most conveniently by gas chromatography, to determine the fraction remaining unchanged for each of the two hydrocarbons.

The "constraint index" is calculated as follows:

$$\text{Constraint Index} = \frac{\log_{10} (\text{fraction of n-hexane remaining})}{\log_{10} (\text{fraction of 3-methylpentane remaining})}$$

The constraint index approximates the ratio of the cracking rate constants for the two hydrocarbons. Zeolites suitable for use as catalyst for the present invention are those having a constraint index from 1.0 to 12.0, preferably 2.0 to 7.0.

The class of zeolites ddefined herein is exemplified by ZSM-5, ZSM-11, ZSM-12, ZSM-21, TEA mordenite and other similar materials. Recently issued U.S. Pat. No. 3,702,886 describing and claiming ZSM-5 is incorporated herein by reference.

ZSM-11 is more particularly described in U.S. Pat. 3,709,979, the entire contents of which are incorporated herein by reference.

ZSM-12 is more particularly described in West German Offenlagunschrifft 2,213,109, the entire contents of which are incorporated herein by reference.

ZSM-21 is more particularly described in U.S. application, Ser. No. 358,192, filed May 7, 1973, the entire contents of which are incorporated herein by reference.

TEA mordenite is more particularly described in U.S. application Ser. No. 130,442 filed Apr. 11, 1971, the entire contents of which are incorporated herein by reference.

The specific zeolites described, when prepared in the presence of organic cations, are catalytically inactive, possibly because the interacrystalline free space is occupied by organic cations from the forming solution. They may be activated by heating in an inert atmosphere at 1000°F for one hour, for example, followed by base exchange with ammonium salts followed by calcination at 1000°F in air. The presence of organic cations in the forming solution may not be absolutely essential to the formation of this type zeolite; however, the presence of these cation does appear to favor the formation of this special type of zeolite. More generally, it is desirable to activae this type zeolite by base exchange with ammonium salts followed by calcination in air at about 1000°F for from about 15 minutes to about 24 hours.

Natural zeolites may sometimes be converted to this type zeolite by various activation procedures and other treatments such as base exchange, steaming, alumina extraction and calcination, in combinations. Natural minerals which may be so treated include ferrierite, brewsterite, stillbite, dachiardite, epistilbite, heulandite and clinoptilolite. The preferred crystalline aluminosilicates are ZSM-5, ZSM-11, ZSM-12, ZSM-21 and TEA mordenite, with ZSM-5 particularly preferred.

In a preferred aspect, the zeolites used herein are selected as those having a crystal density, in the dry hydrogen form, of not substantially below about 1.6 grams per cubic centimeter. It has been found that zeolites which satisfy all three of these criteria are most desired. Therefore, the preferred catalysts of this invention utilize zeolites having a constraint index as defined above of about 1 to 12, a silica to alumina ratio of at least about 12 and a dried crystal density of not less than about 1.6 grams per cubic centimeter. The dry density for known structures may be calculated from the number of silicon plus aluminum atoms per 1000 cubic Angstroms, as given, e.g., on page 11 of the article on Zeolite Structure by W. M. Meier. This paper, the entire contents of which are incorporated herein by reference, is included in "Proceedings of the Conference on Molecular Sieves, London, April, 1967", published by the Society of Chemical Industry, London, 1968. When the crystal structure is unknown, the crystal framework density may be determined by classical pyknometer techniques. For example, it may be determined by immersing the dry hydrogen form of the zeolite in an organic solvent which is not sorbed by the crystal. It is possible that the unusual sustained activity and stability of this class of zeolites is associates with its high crystal anionic framework density of not less than about 1.6 grams per cubic centimeter. This high density, of course, must be associated with a relatively small amount of free space within the crystal, which might be expected to result in more stable structures. This free space, however, is important as the locus of catalytic activity.

The predominantly aliphatic intermediate, e.g., dimethyl ether, produced in the first stage of this invention, and without further conversion, subsequently may be contacted with the above-described aromatizing zeolite catalyst in a separate, second stage at a temperature from 500°F to about 1000°F. The pressure in this second stage may be atmospheric to 3000 psig. Atmospheric pressure is preferred when the feed contains more than about 20 weight percent dimethyl ether. The rate of feed in this stage may be from 0.5 to 1000 WHSV, i.e., from 0.5 lb to 1000 lbs of the intermediate per pound of zeolite catalyst is passed through the zeolite catalyst bed per hour.

Contact of the intermediate in the second stage of the process of the invention can be carried out by passing the intermediate through a bed of the zeolite catalyst. The intermediate will be in the vapor phase and the catalyst bed may be any of the fixed, fixed fluid, or transported bed types. The particle size of the zeolite catalyst may be from 4 to 325 mesh. The second stage can be carried out in a conventional up-flow or down-flow reactor. When the intermediate contains more than about 15 weight percent of unreacted methanol, or consists of more than about 30 weight percent of dimethyl ether, the use of a reactant plug flow arrangement may decrease the formation of durene.

In the preferred embodiment of the invention, following the first stage of the process, at least a portion of the water formed during the first stage is separated from the aliphatic intermediate also formed during the first stage. Preferably, as mentioned, substantially all of the water is separated from the intermediate. Separation of the water cam be effected by subjecting the reaction product from the first stage which, because of the temperatures and pressures employed, is in the gaseous phase, to a cooling procedure whereby the water condenses and the intermediate remains in the gaseous phase. Thus, the reaction product from the first stage can be cooled to or below the boiling point of water but above the boiling point of the dimethyl ether intermediate, for example, at the pressure of the reaction product. The pressure of the reaction product may be increased above that at which it emerged from the first stage to assist in condensation of the water. The pressure may also be decreased if such is considered to be desirable. Separation of the water from the aliphatic intermediate may also be effected by subjecting the reaction product from the first stage to the action of a dehydrating agent. Suitable dehydrating agents include calcium chloride, glycerol, diethylene glycol, and phosphoric acid.

Separation of all of the water from the intermediate prior to the second stage of the process of the invention is not intended to mean separation of such an amount of water that the intermediate is necessarily anhydrous. What is intended is that as much water is separated as can be effected in a practical manner by relatively conventional separation methods. Removal of at least about 50 percent of the water from the intermediate product may substantially extend the useful life of the zeolite catalyst in the aromatization stage. Preferably, however, at least about 95 percent of the water is removed.

In another embodiment of the invention, the dimethyl ether, or other intermediate, without any removal of water therefrom, i.e., in admixture with the water produced in the first stage, is contacted in the second stage with the zeolite catalyst. By introducing this water into the second stage, along with the organic intermediate, it can serve as an auxiliary means for heat removal from the zeolite catalyst.

It is within the scope of this invention, and is another aspect thereof, to carry out the reaction sequence set forth herein more than two (2) stages, i.e., the initial alcohol condensation stage followed by the aromatization stage. According to this aspect of this invention, it may be desirable to introduce a further conversion stage between the alcohol condensation and the aromatization stages. Thus, alcohol may be converted to an ether intermediate which may be in turn exothermally converted to water and aliphatic unsaturated hydrocarbons with the further removal of water from the system. The "second intermediate", now substantially free of bound water, or at least having its bound water proportion significantly reduced, can then be aromatized in a last stage in contact with the aforesaid zeolite catalyst without subjecting such catalyst to inherent steaming accompanying the conversion. This intermediate conversion can be carried out in the effective presence of either the same catalyst as was used for the first stage, or deactivated last stage catalyst or, if desired, in contact with a wholly different or at least different form catalyst. Suitable catalysts for this intermediate dehydration of ether to olefin are: silica-alumina cracking catalyst and ZSM-5 zeolites with a silica to alumina ratio greater than 70, and particularly ZSM-5 catalysts selectively poisoned as taught in copending application, Ser. No. 455,692, filed Mar. 28, 1974, the contents of which are incorporated herein by reference. Suitable intermediate conversion reaction conditions are temperatures from 400°F to 100°F; from 0.5 to 1000 WHSV and from atmospheric to 3000 psig pressure. It is preferred that this intermediate conversion stage be conducted under such combinations of conditions that the chemically combined oxygen content of the organic product, i.e., the second intermediate, is less than about five weight percent. The contemplated intermediate stage conversion involves an increase in the carbon chain-length of the alkyl moiety. Dimethyl ether is converted to ethylene and propylene; diethyl ether forms substantial quantities of $C_3$–$C_6$ olefins. The precise extent of the increase in carbon chain-length will depend on the particular feed, catalyst, and reaction conditions used. It is preferred to use such combinations of feed, catalyst and conversion parameters as will produce a preponderance of olefins having at least 3 carbon atoms.

In regard to the referred to intermediate conversion step, one should be aware that where such is not maintained in the overall process as a distinct, separate stage, it is inherently part of either the first or last stages of a two-stage operation. The purpose of treating it as a separate stage is to maximize the efficiency of the overall process, directing each stage toward the production of a relatively limited product, minimizing the heat removal problems, minimizing the high severity steaming of zeolite aromatization catalyst and additionally, with a methanol or dimethyl ether feed, minimizing the durene formed by minimizing contact between methanol or dimethyl ether and reactive aromatic rings.

It should be clear that if one starts from an otherwise obtained ether reactant, the referred to intermediate ether conversion step may become the initial stage in this process.

The reaction product from the last stage of the reaction will contain aliphatic and aromatic gasoline boiling-range hydrocarbons and it may contain water. It may also contain some unreacted dimethyl ether and it will contain hydrocarbons boiling below the boiling range of gasoline hydrocarbons; a very small amount of hydrocarbons above this boiling range also may be present. The gasoline boiling-range hydrocarbons may be separated from the other components of the reaction product by any suitable means such as distillation.

Having described the invention, the following example is given to illustrate the invention without limiting the scope thereof. Parts and percentages are by weight unless expressly stated otherwise.

EXAMPLE 1

One hundred gallons per hour of industrial grade methanol is passed through a reactor that contains 300 pounds of eight percent cross-linked polystyrene sulfonic acid resin catalyst, available commercially as Dowex 50W-X8. The inlet temperature is 200°F, and the product, comprising dimethyl ether and methanol in a weight ratio of about 3 to 1 together with steam exists at about 390°F. The product stream is cooled, most of the water product separated, and the dimethyl ether-methanol mixture is fed to a reactor that contains 400 pounds of HZSM-5 catalyst pellets maintained at 720°F. The effluent, consisting essentially of hydrocarbons and steam, is cooled and water is separated from the hydrocarbons. The total hydrocarbon product has the composition:

HYDROCARBON
Distribution, Weight %

| | |
|---|---|
| Methane | .20 |
| Ethane | .43 |
| Ethylene | .79 |
| Propane | 13.37 |
| Propylene | 1.83 |
| i-Butane | 18.56 |
| n-Butane | 5.33 |
| Butenes | 1.30 |
| i-Pentane | 9.65 |
| n-Pentane | 1.43 |
| Pentenes | .32 |
| $C_6$ Paraffins and Olefins | 7.24 |
| $C_7^+$ Paraffins and Olefins | 2.53 |
| Benzene | .73 |
| Toluene | 5.42 |
| Ethylbenzene | .91 |
| Xylenes | 14.98 |
| $C_9$ Aromatics | 11.16 |
| $C_{10}$ Aromatics | 3.56 |
| $C_{11}$ Aromatics | .26 |
| Total $C_5^+$ | 58.19 |
| Total Aromatics | 37.02 | from which composition it is apparent that a major fraction consists of gasoline boiling-range hydrocarbons rich in aromatics.

What is claimed is:

1. A method for controlling the exothermic reactions of feed mixtures comprising $C_1$ to $C_3$ alcohols and ethers to form gasoline boiling range products which comprises, contacting a feed comprising methanol with a condensation catalyst under controlled exothermic reaction temperature conditions promoting the formation of water and an aliphatic organic intermediate product comprising ethers and olefins, separating water from said aliphatic organic intermediate product, contacting at least the aliphatic organic intermediate product with a crystalline zeolite aromatizing catalyst under aromatizing conditions, said crystalline zeolite chracterized by a pore dimension greater than 5 Angstroms, a silica/alumina ratio greater than 12, and a constraint index within the range of 1 to 12, and restricting aromatization of organic components in the intermediate product under exothermic generating temperature conditions promoting the formation of gasoline boiling range aromatics to the substantial exclusion of a durene product.

2. The method of claim 1 wherein the reaction conditions chosen during said condensation reactions are exothermic to the extent of generating at least about 50 BTU/lb of hydrocarbon product formed by the method.

3. The method of claim 1 wherein the condensation reactions occur in the presence of a solid acidic catalyst comprising phosphoric acid.

4. The method of claim 1 wherein at least 25 percent of the alcohol feed passed in contact with the condensation catalyst is reacted and unreacted alcohol is separated from the ether product and recycled to the condensation catalyst step.

5. The method of claim 1 wherein the silica/alumina ratio of the crystalline zeolite is greater than 30.

6. The method of claim 1 wherein at least 50 percent of the water is separated from the aliphatic intermediate product before contacting the aromatizing zeolite catalyst.

7. The method of claim 1 wherein the ethers comprising the aliphatic intermediate organic product are converted to olefins in a separate intermediate conversion catalyst stage before effecting conversion thereof to aromatics.

8. The method of claim 1 wherein the intermediate conversion stage is completed under conditions that chemically combined oxygen in the organic product is reduced to less than about five weight percent.

9. A method for converting a feed comprising one or more of $C_1$ to $C_3$ lower alcohols to a hydrocarbon mixture rich in gasoline boiling-range aromatic hydrocarbons, which comprises:

a. exothermally converting at least 25 percent of a lower alcohol feed to at least ethers and water by contact with a condensation catalyst in a first catalytic reaction zone;

b. exothermally catalytically converting said ethers to an olefin rich hydrocarbon intermediate product, said intermediate product being further characterized by having less than about five weight percent chemically combined oxygen;

c. and, aromatizing said olefinic rich hydrocarbon intermediate product in a third reaction zone by contact, at an elevated temperature up to about 1000°F with a crystalline aluminosilicate characterized by a pore dimension greater than 5 Angstroms, a silica to alumina ratio greater than about 30 and a constraint index in the range of 1 to 12 and a crystal density, in the hydrogen form, of not substantially below 1.6 grams per cubic centimeter; and recovering a hydrocarbon mixture including substantial quantities of aromatics in the gasoline boiling range and substantially free of durene.

10. The method of claim 9 wherein said ether conversion zone contains an acidic catalyst selected from the group consisting of alumina, silica alumina, acid activated clay, sodium-poisoned H-ZSM-5, and a ZSM-5 crystalline zeolite having a silica to alumina ratio greater than about 30.

11. The method of claim 9 wherein up to about 50 percent of the water is separated from the olefinic rich hydrocarbon product before contact with the crystalline aluminosilicate catalyst.

12. The method of claim 9 wherein said feed comprises methanol.

13. The method of claim 9 wherein said feed comprises a mixture of methanol and dimethyl ether.

* * * * *

UNITED STATES PATENT AND TRADEMARK OFFICE
CERTIFICATE OF CORRECTION

PATENT NO. : 3,928,483
DATED : December 23, 1975
INVENTOR(S) : Clarence D. Chang, Anthony J. Silvestri, and Robert L. Smith It is certified that error appears in the above-identified patent and that said Letters Patent are hereby corrected as shown below:

| | | |
|---|---|---|
| Col. 1, Line 30 | "definned" | should be --defined--. |
| Col. 2, Line 49 | "alchols" | should be --alcohols--. |
| Col. 6, Line 64 | "ddefined" | should be --defined--. |
| Col. 8, Line 36 | "cam" | should be --can--. |
| Col. 9, Line 36 | "100°F" | should be --1000°F--. |

Signed and Sealed this sixth Day of April 1976

[SEAL]

Attest:

RUTH C. MASON
Attesting Officer

C. MARSHALL DANN
Commissioner of Patents and Trademarks